(12) United States Patent
Yasukawa

(10) Patent No.: US 6,549,301 B1
(45) Date of Patent: Apr. 15, 2003

(54) COLOR PRINTER SYSTEM

(75) Inventor: Kiyoshi Yasukawa, Tokyo (JP)

(73) Assignee: Nec Corporation, Tokyo (JP)

( * ) Notice: Subject to any disclaimer, the term of this patent is extended or adjusted under 35 U.S.C. 154(b) by 0 days.

(21) Appl. No.: 09/404,533

(22) Filed: Sep. 24, 1999

(30) Foreign Application Priority Data

Sep. 25, 1998 (JP) ............................................ 10-270679

(51) Int. Cl.[7] ............................................... G06F 13/00
(52) U.S. Cl. ........................ 358/1.2; 358/1.13; 358/1.15
(58) Field of Search ........................... 358/1.1, 1.2, 1.5, 358/1.6, 1.12, 1.13, 1.14, 1.15

(56) References Cited

U.S. PATENT DOCUMENTS 5,987,226 A * 11/1999 Ishikawa et al. ........... 358/1.13

FOREIGN PATENT DOCUMENTS

| JP | 7-334318 | 12/1995 |
| JP | 8-328789 | 12/1996 |
| JP | 9-258940 | 10/1997 |

* cited by examiner

*Primary Examiner*—Mark Wallerson
(74) *Attorney, Agent, or Firm*—Foley & Lardner

(57) ABSTRACT

In a color printer system which issues printing instruction from its host and performs printing by its printer, the host decides which case of the two following cases can more reduce a quantity of data transferred from the host to the printer; one being that the host performs an image transform and the other being that the printer performs the image transform, and thus decides which should perform the image transform, the host or the printer. When it is decided that the host should perform the image transform, the image transform processing is performed in the host, and information which indicates whether printing data transferred to the printer is the one before an image data transform or after the image data transform is added to printing data. The printing data to which the predetermined information is added is transferred to the printer. The printer receives the printing data transmitted from transmission means of the host, and analyzes the received printing data to decide whether the image transmission processing has been already performed. The printer decides whether the image transform is performed in the printer, and prepares picturing data from the printing data after the image transform, thus performing printing on printing paper based on the picturing data.

14 Claims, 9 Drawing Sheets

FIG.4
ORIGINAL IMAGE RESOLUTION=300dpi
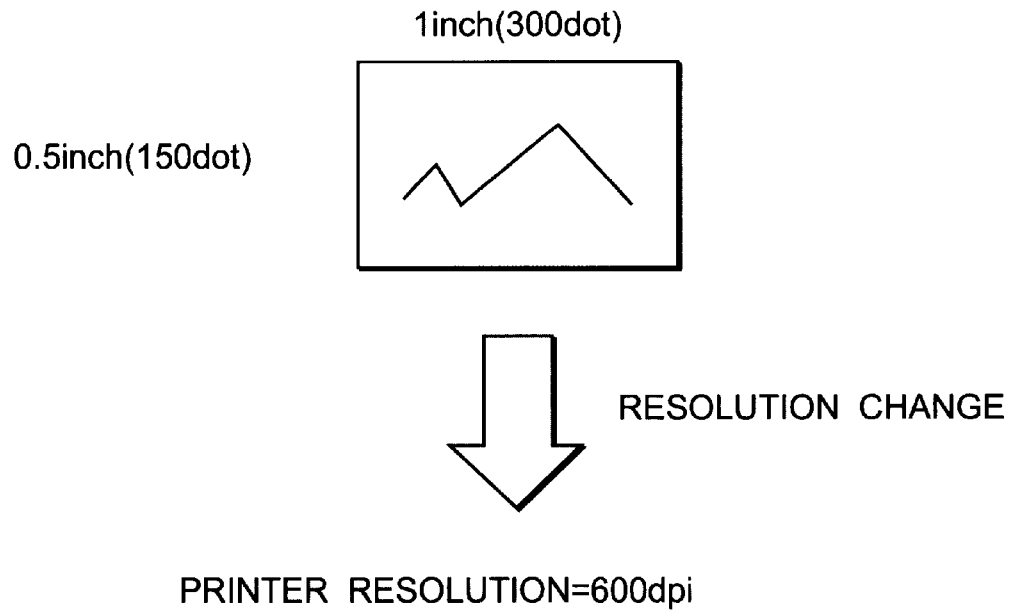
PRINTER RESOLUTION=600dpi
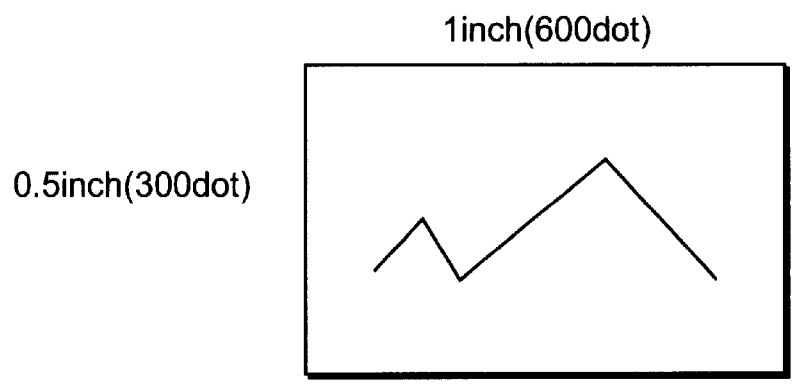
QUANTITY OF DATA OF ORIGINAL IMAGE
300dot × 150dot × 3=135000bytes
QUANTITY OF DATA AFTER BINARIZATION
600dot × 300dot × 4/8=90000bytes

FIG.5
ORIGINAL IMAGE RESOLUTION=100dpi
1inch(100dot)
0.5inch(50dot) 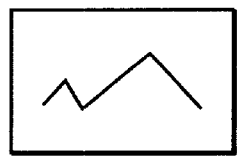
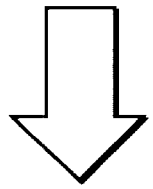 RESOLUTION CHANGE
PRINTER RESOLUTION=600dpi
1inch(600dot)
0.5inch(300dot) 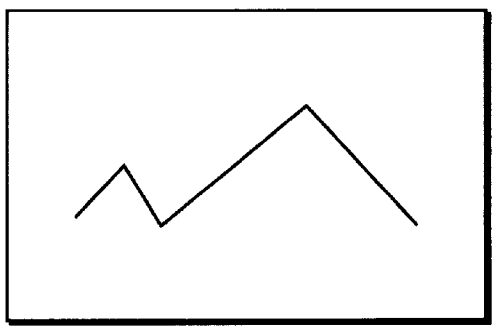
QUANTITY OF DATA OF ORIGINAL IMAGE
100dot × 50dot × 3=15000bytes
QUANTITY OF DATA AFTER BINARIZATION
600dot × 300dot × 4/8=90000bytes

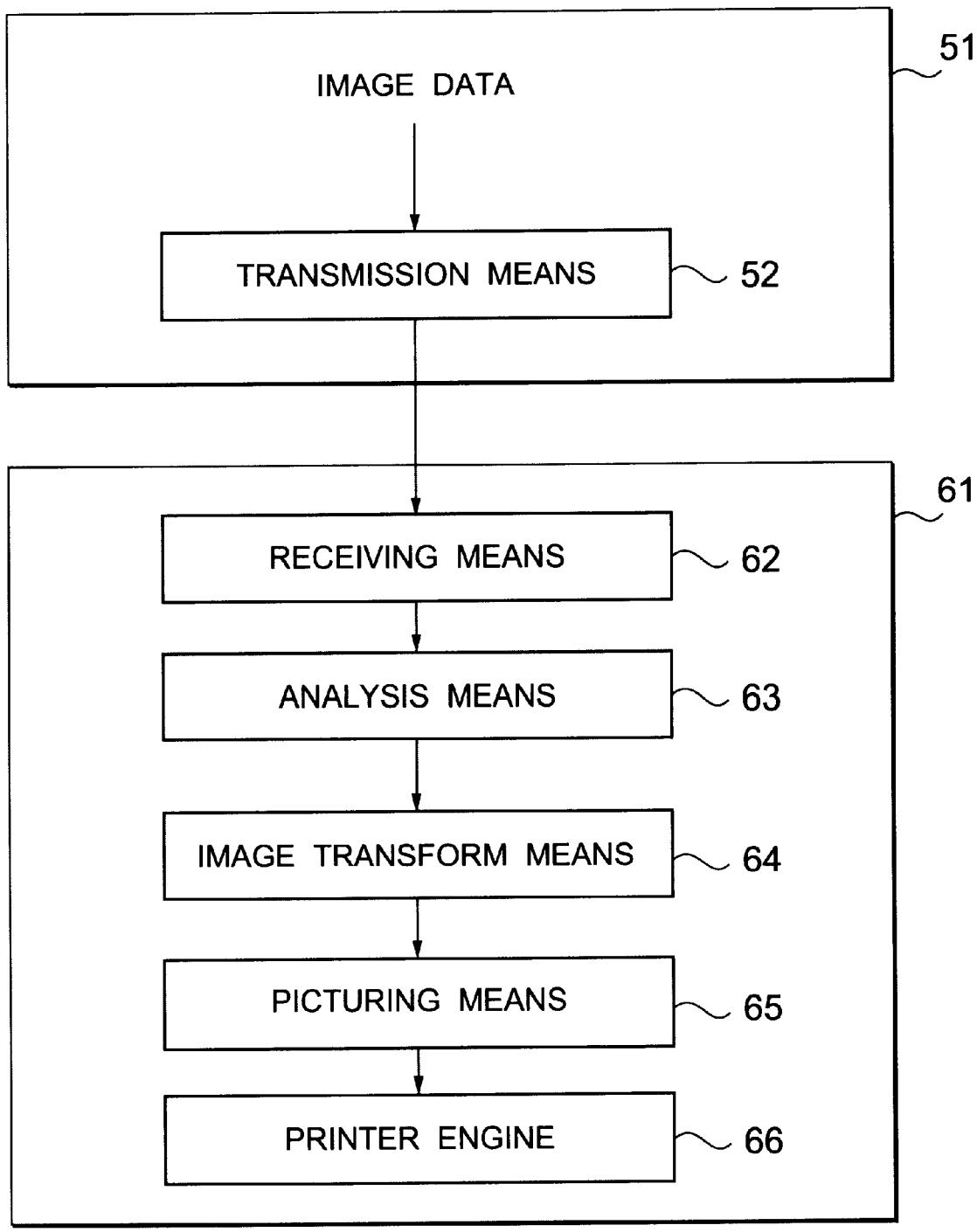

COLOR PRINTER SYSTEM

BACKGROUND OF THE INVENTION

1. Field of the Invention

The present invention relates to a control system of a printer device, more particularly to a color printer system which issues a printing instruction from its host to perform printing by its printer.

2. Description of the Related Art

Explanations for such kind of conventional color printer system will be made with reference to FIG. 9. FIG. 9 shows an example of a construction of a conventional color printer system. Referring to FIG. 9, a host 51 comprises transmission means 52 for transmitting image data to a printer 61. The printer 61 consists of receiving means 62, analysis means 63, image transform means 64, picturing means 65 and a printer engine 66.

In this conventional color printer system, an application on the host issues a printing instruction, and transfers printing data to a printer. The printer performs printing. Moreover, the host 51 does not perform an image transform processing, but the printer 61 exclusively performs the image transform processing.

In other words, image data prepared by the application which is executed in the host 51 is directly sent to the printer 61, and the printer 61 performs a color transform, a resolution change and a gradient processing in accordance with the printer.

As an example of the conventional color printer system, there has also been known a system in which a printer does not comprise image transform means and a host exclusively performs an image transform processing. In this example, for image data prepared by an application, the host performs a color transform, a resolution change and a gradient processing in accordance with a printer, and transfers the image data to the printer. The printer performs only a printing processing.

Furthermore, there has also been known a system in which both a host and a printer comprise image transform means, and a user decides, by using a user interface, which image conversion means to use.

In the color printer system disclosed in Japanese Patent Laid-open No. 9-258940, based on data such as cyan, magenta, yellow and black for each pixel, the host decides whether or not the pixel is white, and if the pixel is white, the host transmits binary data to the printer. If the pixel is not white, the host transmits data of cyan, magenta, yellow and black. The printer develops an image based on the received data. Thus, a quantity of communication data is lessened.

However, the above described conventional system has the following problems.

The first problem is that the quantity of data transferred from the host to the printer cannot be lessened.

This is because an image transform processing is exclusively performed either by the host or by the printer.

In other words, the conventional system comprises no decision means for deciding which case of the two following cases the quantity of data to be transferred is more reduced; one being that the host performs the image transform processing and the other being that the printer performs the image transform processing. Recently, the network of the system has developed, and load on the network has increased. Under such circumstances, a decrease in the quantity of data on the network has been demanded in network printers and the like.

The second problem is that it is impossible to shorten an overall processing time taken for printing. This is because the host or the printer exclusively performs the image transform processing in the same way as the first problem.

SUMMARY OF THE INVENTION

The present invention was invented in view of the foregoing problems, and the object of the present invention is to provide a color printer system which is capable of reducing the quantity of data transferred from a host to a printer, thus shortening an overall time taken for a printing processing.

In a color printer system of the present invention which comprises a host and a printer, each of the host and the printer comprise image transform means; the host comprises image transform decision means for deciding which should be used, the image transform means of the host or the image transform means of the printer; and the image transform means decided by the image transform decision means performs a specified image transform processing.

Moreover, the host may comprise image transform decision means for deciding which case of the two following cases can more reduce the quantity of data to be transferred; one being that the host performs the image transform processing and the other being that the printer performs the image transform processing, and deciding which should be used, image transform means of the host or image transform means of the printer.

According to the present invention, in the color printer system, image transform decision means decides which case of the two following cases can more reduce the quantity of data to be transferred; one being that the host performs the image transform processing and the other being that the printer performs the image transfer processing, and based on the decision result the image transform processing is performed either by the host or the printer, so that the quantity of the data transferred from the host to the printer is decreased, and hence a time taken for the printing processing can be shortened. Furthermore, when the color printer system of the present invention is applied to a network printer, an increase in a network load owing to a printing data transfer can be suppressed.

Furthermore, since the host automatically performs the image transform decision, the quantity of data transferred from the host to the printer is decreased without being known by the user, so that a time required for the printing processing can be shortened.

BRIEF DESCRIPTION OF THE DRAWINGS

For a more complete understanding of the present invention and the advantages thereof, reference is now made to the following description taken in conjunction with the accompanying drawings, in which;

FIG. 4 is an explanatory view for explaining an operation of resolution change processing means of the image transform means in the first embodiment of the present invention;

FIG. 5 is an explanatory view for explaining an operation of resolution change processing means of the image transform means in the first embodiment of the present invention;

FIG. 9 is a block diagram showing a constitution of a conventional color printer system.

DETAILED DESCRIPTION OF THE PREFERRED EMBODIMENTS

Figure 1:
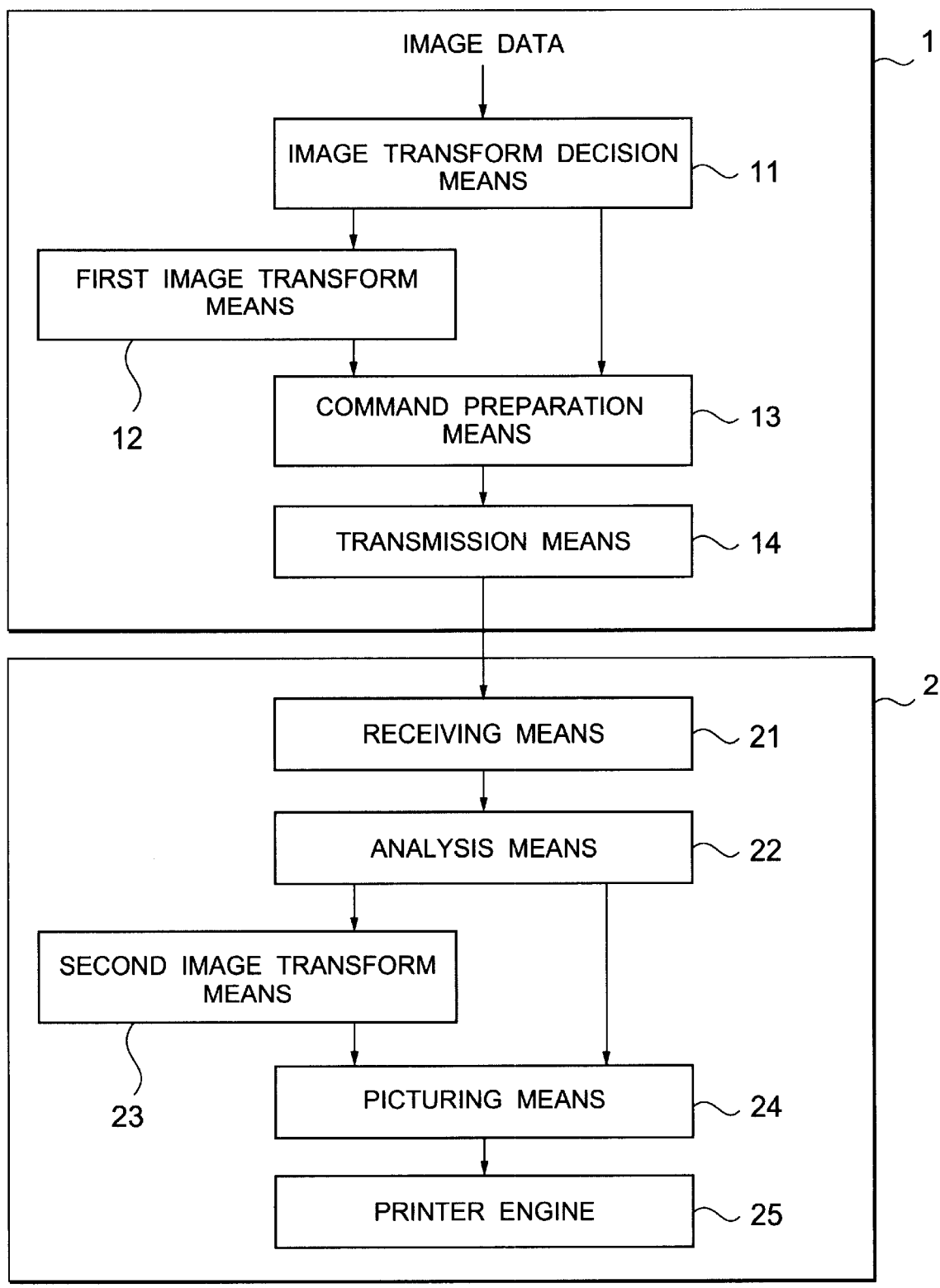
FIG. 1 is a block diagram showing a constitution of a first embodiment of a color printer system of the present invention.
Figure 2:
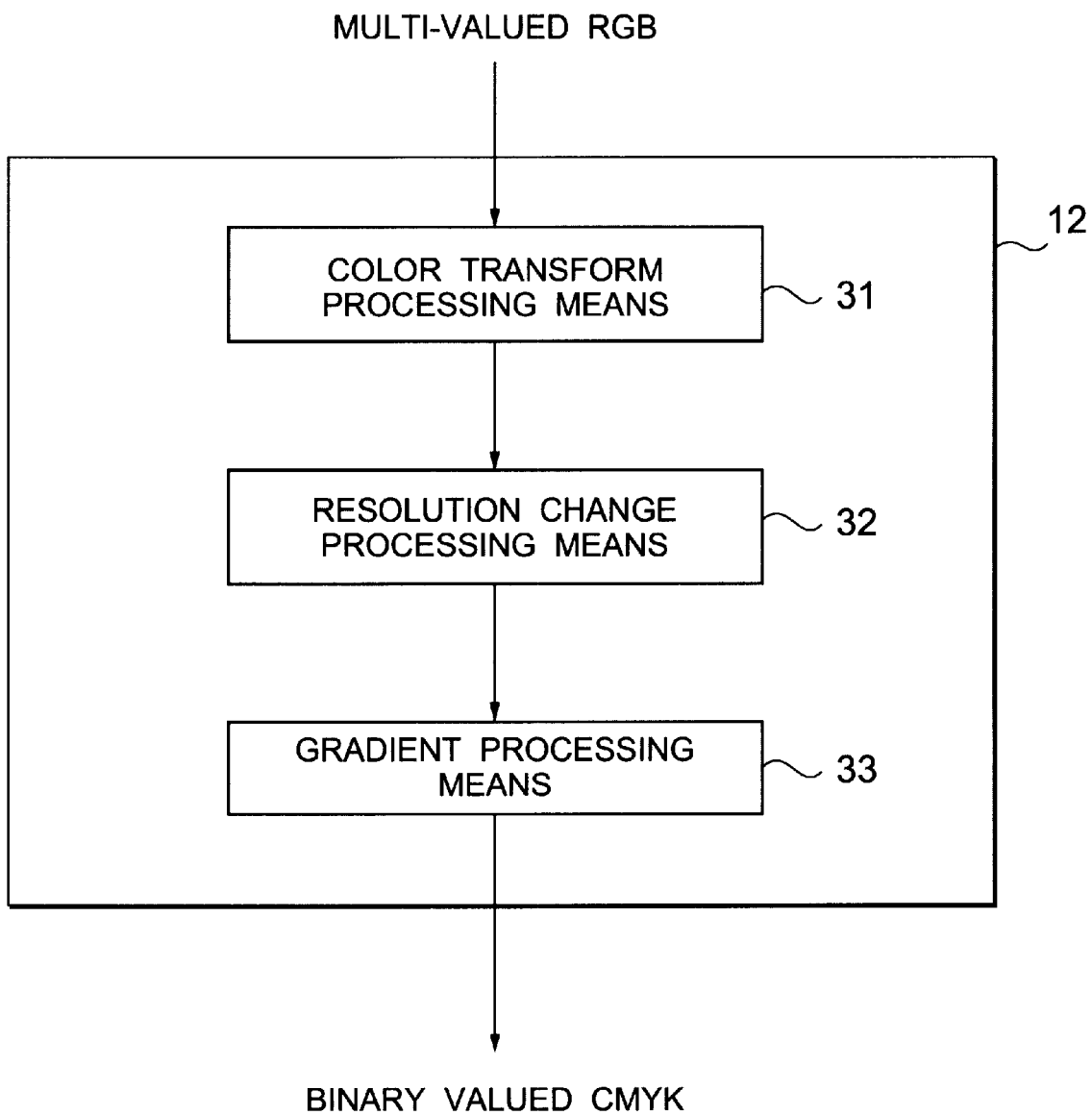
FIG. 2 is a block diagram showing first and second image transform means in the color printer system of the first embodiment of the present invention.

A preferred embodiment of the present invention will be described below. Referring to FIGS. 1 and 2, a color printer system of a first embodiment of the present invention comprises a host 1 and a printer 2, and the host 1 includes:

(a) image transform decision means 11 for deciding which case of the following two cases can more reduce a quantity of data transferred from the host 1 to the printer 2; one being that an image transform processing is performed in the host 1 and the other being that the image transform processing is performed in the printer 2, thus determining which should perform the image transform processing, the host 1 and the printer 2;

(b) first image transform means 12 which performs an image transform processing in the host 1 when the image transform decision means 11 decides that the quantity of data transferred is more decreased in the case where the image transform processing is performed in the host 1, the first image transform means 12 including a color transform processing means 31 for exchanging color data between the host 1 and the printer 2, resolution change processing means 32 for magnifying/reducing an original image so as to fit to a printer resolution when an original image resolution on the host and a resolution of the printer 2 differ from each other, and gradient processing means 33 for performing processing to prepare data in accordance with a gradient processing capability of the printer 2;

(c) command preparation means 13 for adding command information containing flag information indicating whether printing data transferred to the printer is the one before image data transform or after the image data transform and size information of the image to printing data; and (d) transmission means 14 for transferring data obtained by adding the command information to the printing data by the command preparation means 13.

In the present invention, functions of the means of (a) or the means from (a) to (d) may be realized by a program control executed on the host. In this case, the present invention can be embodied by a structure in which the host 1 read out the program from a recording medium such as a CD-ROM on which the program is recorded.

Furthermore, in the present invention, the printer 2 comprises:

(e) receiving means 21 for receiving the printing data transmitted from the transmission means 14 of the host 1;

(f) second image transform means 23 which includes color data exchange processing means 31 for exchanging color data between the host 1 and the printer 2, resolution change processing means 32 for magnifying/reducing an original image so as to fit to a printer resolution when an original image resolution on the host and a resolution of the printer 2 differ from each other, and gradient processing means 33 for performing processing to prepare data in accordance with a gradation processing capability of the printer 2;

(g) analysis means 22 for analyzing the printing data received by the receiving means 21, and deciding whether or not the image transform processing has been already performed by the first image transform means 12 of the host 1, thus deciding based on the decision result whether an image transform should be performed by the second image transform means 23;

(h) picturing means 24 for preparing picture data after the gradation processing from the printing data; and (i) a printer engine 25 for printing picture data prepared by the picturing means 24 on printing paper.

Functions of the means of (g) or the means from (e) to (i) may be realized by a program control executed by a computer which constitutes the printer. In this case, the present invention can be embodied by a structure in which a read-pit printer executes the program from a recording medium such as a CD-ROM on which the program is recorded.

Figure 7:
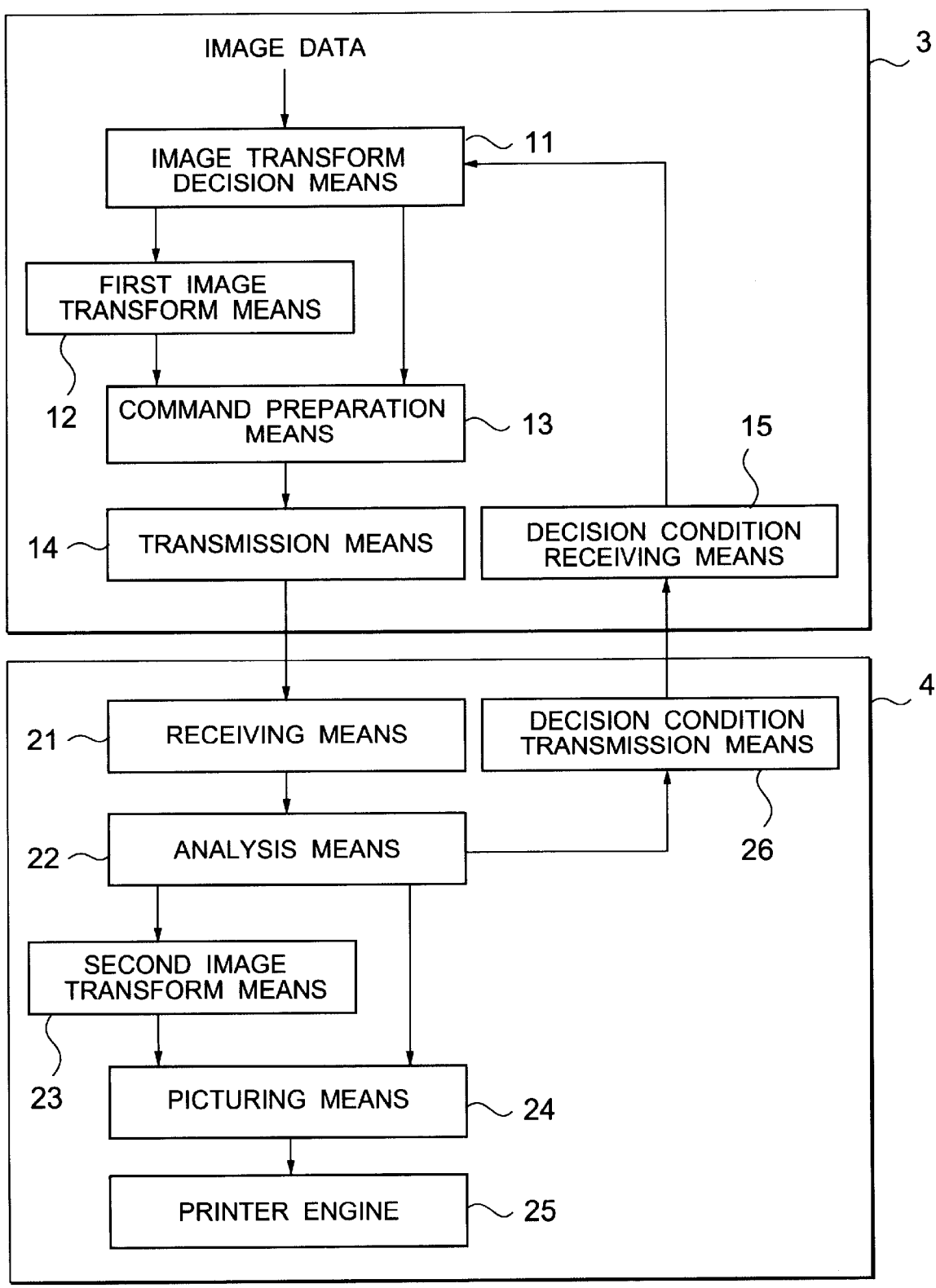
FIG. 7 is a block diagram showing a constitution of a color printer system of a second embodiment of the present invention.

Furthermore, in a color printer system of a second embodiment of the present invention shown in FIG. 7, the printer 4 further comprises means 26 for transferring processing capability information of the printer 4 to the host 3, and the host 3 further comprises means 15 for receiving the processing capability information transferred from the printer 4 and supplying the processing capability information to the image transform decision means 11. Furthermore, considering the processing capability information of the printer 4 and the processing capability information and the data transfer capability of the host 3, the image transform decision means 11 determines the ratio of the resolution of an original image of the printing data to the resolution of the printer 4 in order that the quantity of data at the time when the image transform is performed by the first image transform means 12 of the host 3 is equivalent to that at the time when the image transform is performed by the second image transform means 23 of the printer 4. Then, the image transform decision means 11 may be constituted so as to decide which should perform the image transform, the host 3 or the printer 4, based on the original image resolution information of the printing data, the resolution information of the printer 4 and the foregoing ratio, by which of the two means, the host 3 or the printer 4, the image conversion should be performed.

Embodiments of the present invention will be described in detail.

FIG. 1 is a block diagram showing a constitution of the color printer system of the first embodiment of the present invention. Referring to FIG. 1, the color printer system of the first embodiment consists of the host which constitutes an upper device thereof and the printer 2 which performs printing. The host 1 comprises image transform decision means 11, first image transform means 12, command preparation means 13 and transmission means 14. The host 1 transfers image data prepared on the application which operates on the host 1 to the printer 2 via the printer driver which operates on the host 1. In this embodiment, the image data is multi-valued data.

The image transform decision means 11 determines which should perform the image transform processing, the host 1 or the printer 2. At this time, the image transform decision means 11 decides which case of the two following cases can more reduce the quantity of data transferred from the host 1 to the printer 2; one being that the host 1 performs the image transform processing and the other being that the printer 2 performs the image transform processing. The image transform decision means 11 prefers the case where the quantity of data is more reduced.

The first image transform means 12 performs the image transform processing when the image transform decision means 11 determines that the image transform is performed by the host 1.

The command preparation means 13 performs processings to add a flag indicating whether the image transform processing was performed by the host 1 and a command for setting an image size and the like to the printing data. In this embodiment, since multi-valued image data is binarized by the image transform processing, the flag indicates whether the printing data to be transferred to the printer 2 is multi-valued or binary.

The transmission means 14 transfers to the printer 2 the printing data to which the flag and the command are added by the command preparation means 13.

The printer 2 is a color page printer, which includes the receiving means 21, the analysis means 22, the second image transform means 23, the picturing means 24 and the printer engine 25.

The receiving means 21 is connected to the transmission means 14 of the host 1, and the receiving means 21 receives the printing data from the host 1.

The analysis means 22 analyzes the printing data received, and decides whether the image transform processing has been already performed by the first image transform means 12 of the host 1. The analysis means 22 determines based on the decision result whether the image transform should be performed by the second image transform means 23. To be concrete, the analysis means 22 detects the flag added to the printing data by the command preparation means 13, and decides whether the printing data transferred is multi-valued or binary. If the printing data is multi-valued data, the analysis means 22 decides that the image transform processing has not been performed yet. If the printing data is multi-valued data, the analysis means 22 decides that the image transform processing has been already performed.

If the analysis result by the analysis means 22 shows that the printing data is multi-valued data, the second image transform means 23 performs the image transform processing in the printer 2.

From the printing data, the picturing means 24 prepares the picturing data to be output to the printer engine 25 after the gradient processing.

The printer engine 25 prints the image on paper based on the picture data prepared by the picturing means 24.

Subsequently, descriptions for the first and second image transform means 12 and 23 will be made with reference to FIG. 2.

The first and second image transform means include the color transform processing means 31, the resolution change processing means 32 and the gradient processing means 33, respectively.

The color transform processing means 31 is means for converting data of the original image to the data for printing the color image by the printer when the data of the original image is based on different color constitution from the data for printing the color image. For example, when the original image is an image for displaying the color image on a display device, the data of the original image is RGB (Red, Green, Blue) data. On the other hand, the data for printing the color image by the printer is CMY (Cyan, Magenta, Yellow) data or CMYK (Cyan, Magenta, Yellow, Black) data. In this case, the color transform processing means 31 converts the RGB data to either the CMY data or the CMYK data. Furthermore, the color region that can be reproduced on the display device is generally from that in the printer. Accordingly, the color transform processing means 31 performs also a color correction so that the colors reproduced by the display device look to be as equivalent as possible to those reproduced by the printer.

The resolution change processing means 32 performs magnification and reduction so that the image data and the printing result have the same size, when the resolution of the original image is set to a resolution different from that of the printer.

For example, in a situation where the resolution of the original image is 120 dpi and the resolution of the printer is 600 dpi, when the original image having a height of 1 inch (120 dot) and a width of 1 inch (120 dot) is printed by the printer as it is, the printed image has a height of 0.2 inch (120 dot) and a width of 0.2 inch (120 dot). Accordingly, in order that the original image and the printed image have the same size, the original image is magnified or reduced in accordance with the ratio of the resolution of the original image of the printing data to that of the printer. This processing is called a resolution change processing. In this example, the original image is magnified five times in its height and width in accordance with the ratio of the resolution, in order that the image printed by the printer has the height of 1 inch and the width of 1 inch.

The gradient processing means 33 performs a processing for preparing the printing data in accordance with the gradient processing capability of the printer, the printing data having being subjected to the color change by the color transform by the color transform processing means 31 and to the magnification/reduction by the resolution change processing means 32. In general, the gradient processing means 33 uses a gradient processing called dither and error diffusion. In this embodiment, the printing data is converted to binary data for each color.

Figure 3:
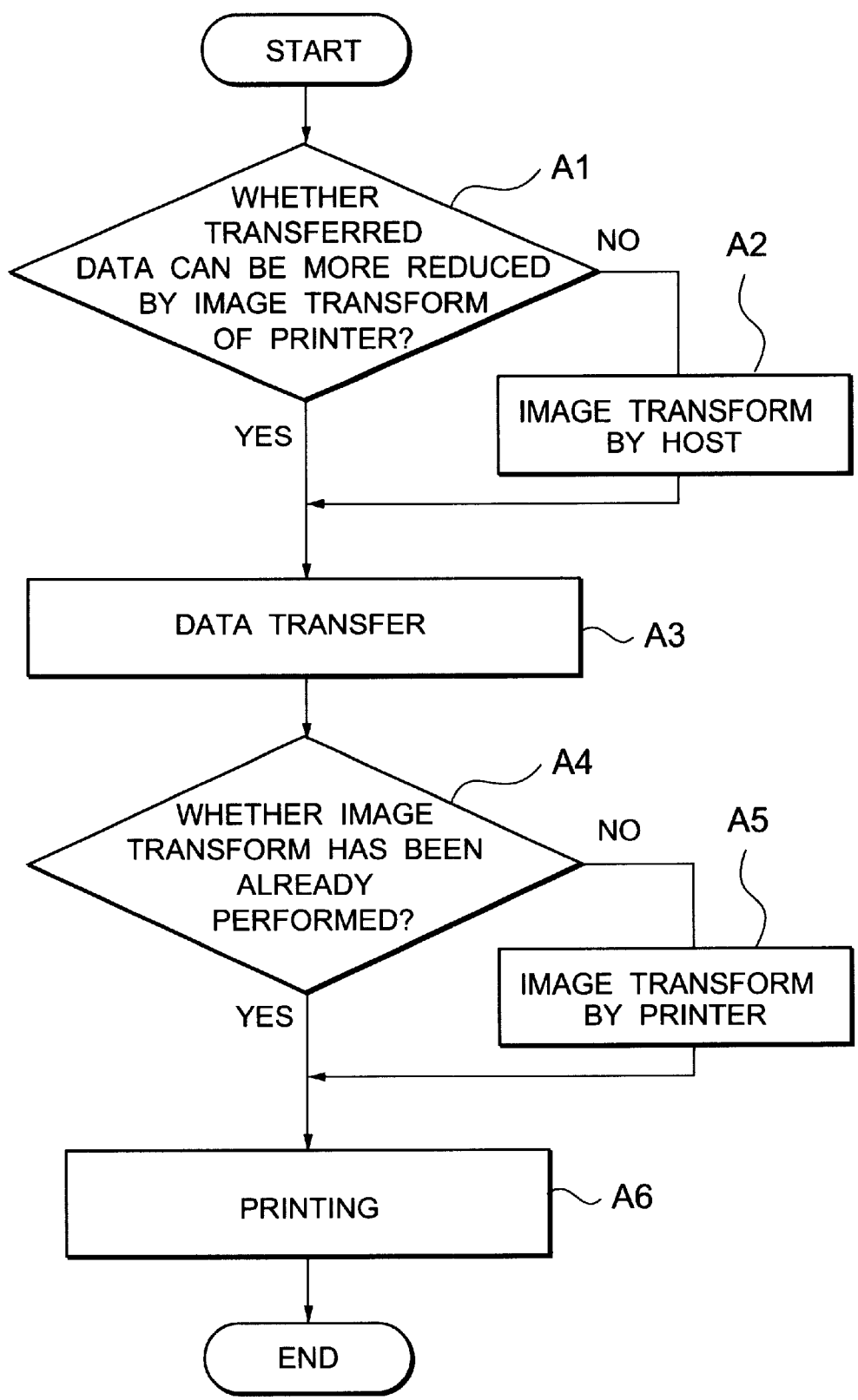
FIG. 3 is a flowchart for explaining an operation of the color printer system in the first embodiment of the present invention.

FIG. 3 is a flowchart showing processings in the color printer system of the first embodiment of the present invention. Referring to FIGS. 1 to 3, an operation of the color printer system of the first embodiment of the present invention will be described in detail.

The image transform decision means 11 decides whether the quantity of data transferred from the host 1 to the printer 2 can be more reduced when the image transform is not performed by the host 1 but by the printer 2 (step A1 of FIG. 3).

If the image transform decision means 11 decides that the quantity of data can be more reduced, the command preparation means 13 composes the flag indicating that the printing data is multi-valued or binary and the command used for setting an image size, and adds it to the printing data. The transmission means 14 transfer the printing data (step A3 of FIG. 3). If the image transform decision means 11 decides that the quantity of data cannot be reduced, the first image transform means of the host 1 performs the image transform processing (step A2 of FIG. 3), and then the printing data is transferred by the transmission means 14 (step A3 of FIG. 3).

The receiving means 21 of the printer 2 receives the printing data transmitted from the transmission means 14 of the host 1, and the analysis means 22 of the printer 2 analyzes whether the printing data has already been subjected to the image transform by the host 1 (step A4 of FIG.

3). If the printing data has already been subjected to the image transform, the analysis means 22 outputs the printed data that has been subjected to the image transform to the printer engine 25, and the printer engine 25 performs printing (step A6 of FIG. 3).

If the image transform has not be been performed by the host 1, the second image transform means 23 of the printer 2 performs the image transform processing (step A5 of FIG. 3), and thereafter the printer engine 25 performs the printing (step A6 of FIG. 3).

Next, descriptions for the original image and the quantity of data after the image transform processing will be made with reference to FIGS. 4 and 5 concretely.

As shown in FIG. 4, the size of the original image is assumed to be 300 dot×150 dot and the resolution of the original image is assumed to be 300 dpi. Moreover, the resolution of the printer 2 is assumed to be 600 dpi. In order to obtain a printed image having the same size as that of the original image, the resolution change must be performed. In the example shown in FIG. 4, after the image transform processing (color transform, resolution change and binarization), the original image must be magnified twice in its height and width in accordance with the resolution in order to prevent the image size change.

Furthermore, the original image is RGB data and multi-valued data of eight bits for each R, G and B. The printing data becomes CMYK data by the color transform, and binarized. The printing data becomes binary data of one bit (1/8 byte) for each CMYK.

In this example, the quantity of multi-valued data of the original image is 300 dot×150 dot×3 (135000 bytes). Moreover, the quantity of multi-valued data after the image transform processing is 600 dot×300 dot×4/8 (90000 bytes).

Accordingly, in the example shown in FIG. 4, the quantity of data to be transferred from the host 1 to the printer 2 can be more reduced when the data is the one after the image transform processing. The image transform processing should be performed by the first image transform means 12 of the host 1.

On the other hand, in the example shown in FIG. 5, the resolution of the original image is data of 100 dpi. The resolution of the printer is 600 dpi, and it is necessary to perform the resolution change, in order to obtain the printed image of the same size as the original image. In the example shown in FIG. 5, the printed image must be magnified six times in its height and width in accordance with the resolution. The printing data of the original image is RGB data, the same as the example of FIG. 5, and multi-valued data of eight bits for each of R, G and B. Moreover, by the color transform the printing data becomes binary data of one bit (1/8 byte) for each of CMYK, the same as the example of FIG. 4.

In this example, the quantity of multi-valued data of the original image becomes 100 dot×50 dot×3 (15000 bytes). The quantity of data after the image transform processing becomes 600 dot×300 dot×4/8 (90000 bytes).

Accordingly, in the example shown in FIG. 5, the quantity of data to be transferred from the host 1 to the printer 2 is more reduced in the case where the original image remains as it is. The image transform processing should be performed by the second image transform means 23 of the printer 2.

Figure 6:
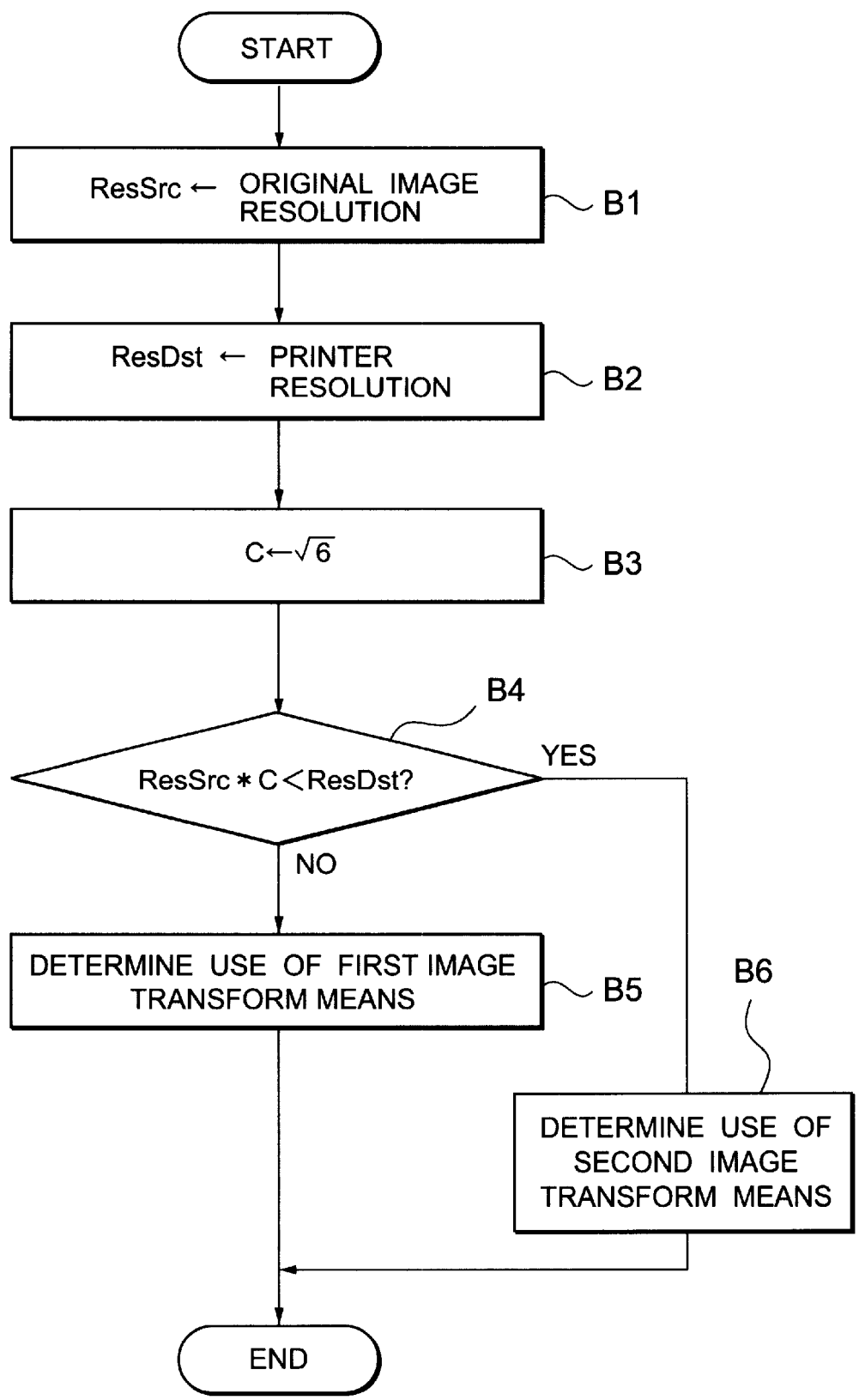
FIG. 6 is a flowchart for explaining an operation of image transform decision means in the first embodiment of the present invention.

FIG. 6 is a flowchart showing processings by the image transform decision means 11 of the first embodiment of the present invention. An operation of the image transform decision by the image transform decision means 11 of this embodiment with reference to FIG. 6 will be explained in detail.

First, in the image transform decision means 11, the resolution of the original image is substituted for the variable ResSrc (step B1 of FIG. 6). Next, the resolution of the printer is substituted for the variable ResDst (step B2 of FIG. 6).

Next, calculated is the constant $\sqrt{6}$ for deciding which case of the two following cases the quantity of data to be transferred from the host 1 to the printer 2 can be more reduced; one being that the first image transform means 12 of the host 1 performs the image transform processing and the other being that the second image transform means 23 of the printer 2 performs the image transform processing. The obtained constant is substituted for the constant C (step B3 of FIG. 6). This constant C is a value indicating a ratio of the original image resolution ResSrc to the printer resolution ResDst, which makes the quantity of data transferred from the host 1 to the printer 2 at the time when the image transform processing is performed by the host 1 equal to that when the image transform processing is performed by the printer 2. In other words, this means that when a value C times as large as the original image resolution ResSrc is equal to the printer resolution ResDst, the quantity of data transferred from the host 1 to the printer 2 at the time when the image transform processing is performed by the host 1 is equal to that at the time when it is performed by the printer 2.

Description on how to calculate this constant will be described concretely.

As described in the examples shown in FIGS. 4 and 5, with reference to the original image, the number of colors for one pixel is assumed to be three, that is, R, G and B, and the quantity of data for each color is assumed to be one byte. With reference to the image data after the image transform processing, the number of colors for one pixel is assumed to be four, that is, C, M, Y and K, and the quantity of data for each color is assumed to be 1/8 byte. Moreover, the quantity of data of the original image is assumed to be W×H pixels.

When the image transform processing is performed, the image is magnified ResDst/ResSrc times in its height and width in accordance with the resolution in order to make the size of the original image and that of the printed image equal to each other. When it is assumed that a value when a value C times as large as the original image resolution ResSrc is equal to the printer resolution ResDst as described above, the image is magnified C times in its height and width.

When the resolution transform processing is performed by the host 1 under these preconditions, the quantity of data transferred from the host 1 to the printer 2 is C×W×C×H× 4×1/8 bytes. On the other hand, when the resolution transform processing is performed by the printer 2, the quantity of data transferred from the host 1 to the printer 2 is W×H×3 bytes.

Both of the quantities of data are equal to each other when C×W×C×H×4×1/8=W×H×3 is satisfied. Accordingly, the value of C which makes the quantity of data transferred from the host 1 to the printer 2 at the time when the image transform processing is performed by the host 1 equal to that at the time when the image transform processing is performed by the printer 2 is $\sqrt{6}$.

Based on the descriptions described above, assuming that the number of colors of the original image per one pixel is N1, that the quantity of data of the original image per one color is D1 byte, that the number of colors of the image data after the image transform processing per one pixel is N2, and that the quantity of image data after the image transform processing per one color is D2 byte, it is proved that the value of C which makes the quantity of data transferred from the host 1 to the printer 2 at the time when the image transform processing is performed by the host 1 equal to that at the time when the image transform processing is performed by the printer 2 is $\{(N1 \times D1)/(N2 \times D2)\}^{\wedge}(1/2)$.

It is decided whether the quantity of data is increased or reduced by the image transform processing, by deciding whether ResSrc×C<ResDst is satisfied (step B4 of FIG. 6).

If ResSrc×C<ResDst is satisfied as a result of the decision, the quantity of data to be transferred from the host 1 to the printer 2 increases by the image transform processing, so that the printing data is transferred from the host 1 to the printer 2 without performing the image transform processing. Accordingly, the use of the second image transform means 23 is determined (step B6 of FIG. 6). If ResSrc×C≧ResDst is satisfied, the quantity of data to be transferred from the host 1 to the printer 2 is reduced by the image transform processing, so that the use of the first image transform means 12 is determined (step B5 of FIG. 6).

In this embodiment, when a processing capability of the host (capability of a CPU) and that of the printer (capability of a CPU) at an equal level and a transfer capability of the host is at a level higher than the processing capability of the printer, so that the host can transfer the data very quickly, it can be decided whether a printing time can be shortened on the whole. When the processing capability of the host is very quick and the processing capability of the printer is very slow, the processing time can be more shortened, on the whole, by a use of the host for processing. On the contrary, when the processing of the host is very slow and the processing of the printer is very quick, the processing time can be shortened, on the whole, by a use of the printer for the processing. Accordingly, when the processing capability of the host and that of the printer are different from each other, it is necessary to decide by which processing means, the host or the printer, more merits are brought about, by utilizing processing capability information. Moreover, although the printer has a high processing capability, when the data transferred very slowly is not readily sent to the printer, the processing in the printer is not progressed. Accordingly, the transfer speed must be considered, too.

A second embodiment of the present invention will be described below. FIG. 7 is a figure showing a constitution of the second embodiment of the present invention. Referring to FIG. 7, the host 3 of the second embodiment of the present invention further comprises decision condition receiving means 15 added to the constitution of the host 1 of the first embodiment shown in FIG. 1. The printer 4 of the second embodiment of the present invention further comprises decision condition transmission means 26 added to the constitution of the printer 2 of the first embodiment shown in FIG. 1.

The decision condition transmission means 26 of the printer 4 transfers the processing capability information of the printer 4 to the host 3. The processing capability information is, for example, a quantity of data processable in a unit time.

The decision condition receiving means 15 of the host 3 receives the printing processing capability information transferred from the printer 4, and propagates this information to the image transform decision means 11.

Figure 8:
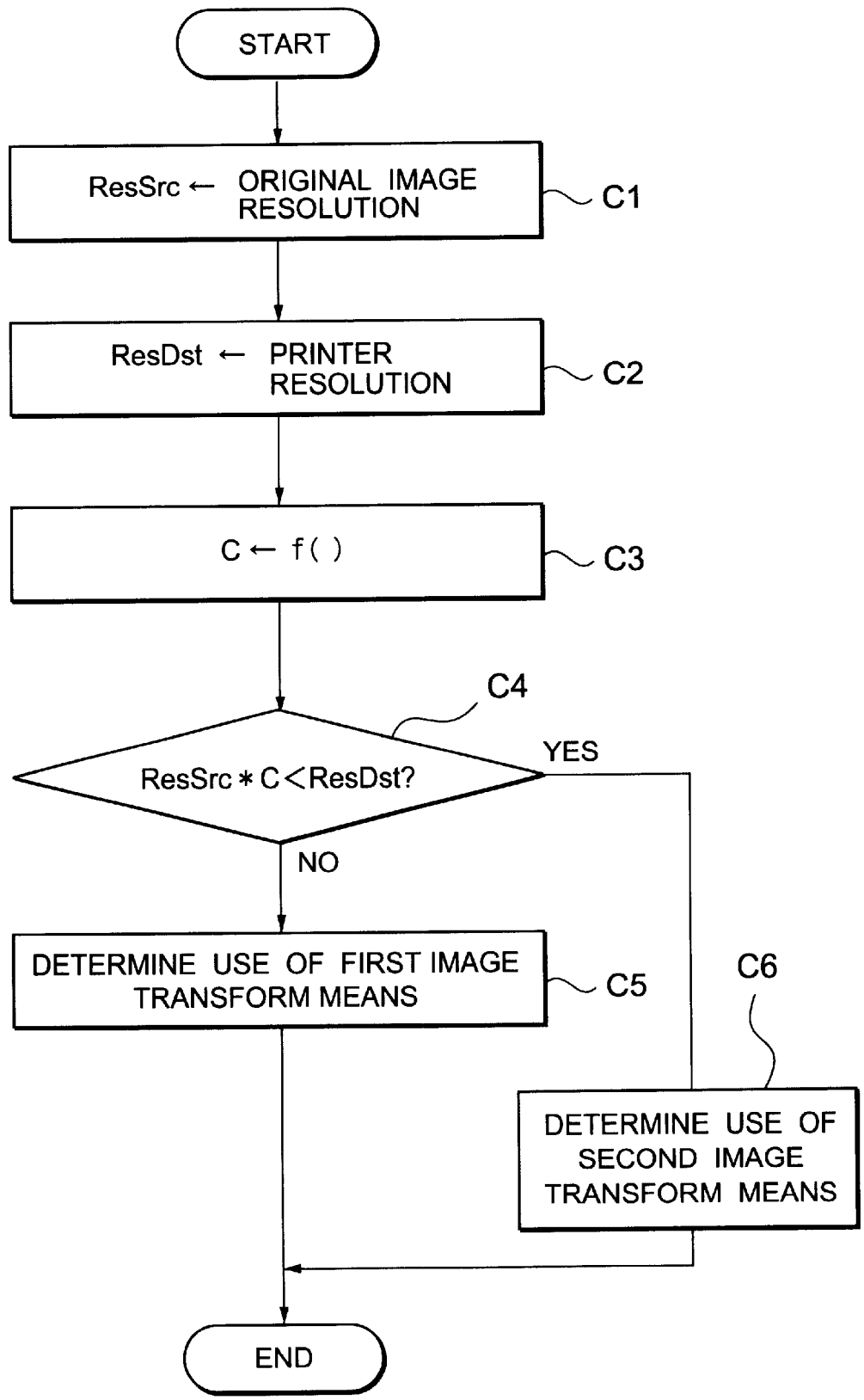
FIG. 8 is a flowchart for explaining an operation of image transform decision means in the second embodiment of the present invention.

FIG. 8 is a flowchart showing processings for deciding the image transform means by the image transform decision means 11 in the second embodiment of the present invention. Referring to FIGS. 7 and 8, an operation of the second embodiment of the present invention will be described mainly focusing on the image transform decision means 11.

First, the resolution of the original image is substituted for the variable Res Src in the image transform decision means 11 (step C1 of FIG. 8).

Next, the resolution of the printer is substituted for the variable ResDst (step C2 of FIG. 8).

Next, the reference value C is obtained from the function f( ), which is for deciding which of two cases is more preferable in order to more shorten the whole of the printing time; the one is that the image transform processing is performed by the first image transform means 12 of the hosts and the other is that the image transform processing is performed by the second image transform means 23 of the printer 2 (step C3 of FIG. 8). Here, the function f( ) is calculated with reference to the processing capability of the host 1; the processing capability information of the printer 4, which is received by the decision condition receiving means 15 from the printer 4; and the data transfer capability information, in addition to the change of the quantity of data by the color transform and the gradient processing performed by the image transform means. To be concrete, assuming that the number of colors for one pixel of the original image is N1, that the quantity of data for one color of the original image is D1 byte, that the number of colors for one pixel of the image data after the image transform processing is N2, and that the quantity of data for one color of the image data after the image transform processing is D2 byte, a provisional reference value C' is calculated from the equation $C'=\{(N1 \times D1)/(N2 \times D2)\}^{\wedge}(1/2)$. The changing ratio E is examined to know how long the whole of the processing time changes between two cases depending on the difference in the processing capability between the host 3 and the printer 4, one being that the image transform is performed by the host 3 and the other being that the image transform is performed by the printer 4. Then, C' is multiplied by the square root F of the changing ratio E, thus obtaining the reference value C=C'×F. Then, when data which is transferred very slowly is not sent from the host 1 to the printer 4 in spite of a high processing capability of the printer 4, the processing in the printer 4 is not progressed. Accordingly, the transfer speed from the host 3 to the printer 4 is calculated by actually transferring the data. For example, the data for transfer speed measuring is previously stored in the image transform decision means 11. of the host 3, and the data stored therein is transmitted to the printer 4 through the command means 13 and the transmission means 14. Before the transmission of the data to the printer 4, the transmission starting time and the quantity of transmission data are previously given to the data for the transmission speed measuring. Moreover, for example, the analysis means 22 of the printer 4 receives the data for the transmission speed measuring through the receiving means 21, and computes the transmission capability from a time of completion of data receipt, the transmission starting time and the quantity of transmission data given to the data for the transmission speed measuring. Then, the transmission capability obtained by the computation is transmitted to the image transform decision means 11 through the decision condition transmission means 26 and the decision condition receiving means 15. If the transmission capability is slower than the processing capability of the printer 4, the data transfer capability is used as the processing capability of the printer 4. It should be noted that the data transfer capability is a quantity of data transferrable from the host 3 to the printer 4 per unit time.

Then, it is decided whether or not ResSrc×C<ResDst is satisfied (step C4 of FIG. 8). If ResSrc×C<ResDst is satisfied, the use of the second image transform means is determined (step C6 of FIG. 8), and if ResSrc×C<ResDst is not satisfied, the use of the first image transform means is determined (step C5 of FIG. 8).

In the description for the second embodiment of the present invention, it was described that the function f( ) is calculated with reference to the processing capability information of the host 1, the processing capability information of the printer 4 received by the decision condition receiving means 15 and the data transfer capability information. However, information to be referred to is not limited to the above information as long as it can be utilized for shortening the whole of the processing time taken for the printing processing.

Although the preferred embodiments of the present invention have been described in detail, it should be understood that various changes, substitutions and alternations can be made therein without departing from spirit and scope of the inventions as defined by the appended claims.

What is claimed is:

1. A color printer system which includes a host issuing printing instruction and a printer performing printing, wherein said host comprises means for deciding which should perform an image transform processing to finish said printing fast, the host or the printer, and means for performing said image transform processing when said host should perform said image transform processing, and said printer comprises means for performing said predetermined image transform processing when said image transform means does not perform said image transform processing.

2. The color printer system according to claim 1, wherein said means for deciding which should perform said image transform processing decides it based on a quantity of data transferred from said host to said printer, to decide which should perform said image transform processing, the host or the printer.

3. The color printer system according to claim 2, wherein said means for deciding which should perform said image transform processing decides it based on a performance information relating to said host and said printer and transfer capability information to decide which should perform said image transform processing, the host or the printer.

4. A color printer system which includes a host issuing printing instruction and a printer performing printing wherein said host includes:

image transform decision means for deciding which case of the two following cases results in a greater reduction in a quantity of data transferred from said host to said printer; one being that said host performs an image transform and the other being that said printer performs the image transform, thus determining which case should be better for performing the image transform, the case of employing said host and the case of employing said printer;

first image transform means for performing an image transform processing in said host when said image transform decision means decides that the quantity of data transferred from said host to said printer is more reduced by the image transform processing in said host;

command preparation means for adding predetermined command information containing flag information indicating whether printing data transferred to said printer is the one before image data transform or after the image data transform and size information of the image to printing data; and transmission means for transferring data to said printer the data being obtained by adding by the command preparation means, the command information to printing data which has been subjected to the image transform processing of said first image transform; and wherein said printer includes:

receiving means for receiving the printing data transmitted from said transmission means of said host;

second image transform means for performing an image transform processing;

analysis means for analyzing the printing data received by said receiving means, and deciding whether the image transform processing has already been performed by said first image transform means of said host, thus deciding based on the decision result whether an image transform should be performed by said second image transform means;

picturing means for preparing picture data from the printing data that has been subjected to the image transfer; and a printer engine for performing printing on printing paper based on said picture data.

5. The color printer system according to claim 4, wherein said second image transform means of said printer performs the image transform processing when said analysis means decides that the printing data is multi-valued.

6. The color printer system according to claim 4, wherein said image transform decision means determines which should performs the image transform, said host or said printer, based on a resolution of an original image of the printing data, a resolution of said printer and a ratio of the resolution of the original image of the printing data to the resolution of said printer, said ratio being for making the quantity of data transferred from said host to said printer at the time when the image transform is performed by said first image transform means of said host equivalent to that at the time when the image transform is performed by said second image transform means of said printer.

7. The color printer system according to claim 4, wherein said printer further comprises means for transferring processing capability information of said printer to said host, said host comprises means for receiving the processing capability information of said printer transferred from said printer and for supplying the processing capability information of said printer to said image transform decision means, and said image transform decision means determines, considering the processing capability information of said printer, processing capability information of said host and data transfer performance information, a ratio of a resolution of an original image of the printing data to a resolution of said printer, said ratio being for making the quantity of data transferred from said host to said printer at the time when the image transform is performed by said first image transform means of said host equivalent to that at the time when the image transform is performed by said second image transform means of said printer, and determines which should performs the image transform based on said ratio of the resolution of the original image of the printing data to the resolution of said printer.

8. The color printer system according to claim 4, wherein each of said first and second image transform means comprises:

color transform processing means for exchanging color data between said host and said printer;

resolution change processing means for magnifying and reducing said original image so that the resolution of said original image on said host is made to be equal to the resolution of said printer, when the resolution of said original image on said host and the resolution of said printer are different from each other; and gradient processing means for preparing the printing data in accordance with the gradient processing capability of said printer, the printing data having being subjected to the color exchange by said color transform processing means and to the magnification/reduction by said resolution change processing means.

9. A computer-usable medium having computer-readable program therein for causing a host issuing printing instruction to a printer in a color printer system, to perform the steps of:

(a) deciding which case of the two following cases results in a greater reduction in a quantity of data transferred from said host to said printer; one being that said host performs an image transform processing and the other being that said printer performs the image transform processing, thus determining which should perform the image transform processing, said host or said printer;

(b) performing an image transform processing in said host when it is decided by an image transform decision means that a performance of the image transform processing in a host results in a greater reduction in the quantity of transferred data, the first image transform means including color transform processing means for exchanging color data between said host and said printer; resolution change processing means for magnifying and reducing an original image so that the resolution of said original image on said host is made to be equal to the resolution of said printer, when the resolution of said original image on said host and the resolution of said printer are different from each other; and gradient processing means for preparing printing data in accordance with a gradient processing capability of said printer, the printing data having been subjected to the color exchange by said color transform processing means and to the magnification/reduction by said resolution change processing means;

(c) adding to printing data, command information containing flag information indicating whether printing data transferred to said printer is the one before image data transform or after the image data transform and size information of the image; and (d) transferring data to said printer, the data being obtained by adding, by a command preparation means, command information to printing data which has been subjected to the image transform processing of said first image transform means and to printing data which has not been subjected to the image transform processing of said first image transform means.

10. The computer-usable medium as recited in claim 9, wherein the program causes the host to perform printing based on the printing instruction from the host by:

(e) receiving printing data in a receiving means transmitted from a transmission means of said host;

(f) performing color data exchange processing including exchanging color data between said host and said printer, magnifying/reducing an original image so as to fit to a resolution of said printer when a resolution of said original image on said host and the resolution of said printer differ from each other, and preparing the printing data in accordance with the gradient processing capability of said printer, the printing data having been subjected to a color change by said color transform processing means and to the magnification/reduction by said resolution change processing means;

(g) analyzing the printing data received by said receiving means, and deciding whether the image transform processing has already been performed by said first image transform means of said host, thus deciding based on a decision result whether an image transform should be performed by said printer; and (h) preparing picture data from the printing data having been subjected to the image transform.

11. A printer performing printing based on a printing instruction from a host, comprising:

receiving means for receiving a printing data;

analysis means for analyzing the printing data received by said receiving means, and deciding whether an image transform processing has been already performed, thus deciding based on the decision result whether an image transform should be performed to said printing data;

image transform means for performing an image transform processing when said image transform should be performed to said printing data;

picturing means for preparing picture data from the printing data that has been subjected to the image transfer; and a printer engine for performing printing on printing paper based on said picture data.

12. The printer according to claim 11, wherein said image transform means including:

color data exchange processing means for exchanging color data between said host and said printer;

resolution change processing means for magnifying/reducing an original image so as to fit to a resolution of said printer when a resolution of said original image on said host and the resolution of said printer differ from each other; and gradient processing means performs a processing for preparing the printing data in accordance with the gradient processing capability of said printer, the printing data having been subjected to the color change by said color transform processing means and to the magnification/reduction by said resolution change processing means.

13. The printer according to claim 11, wherein said second image transform means of said printer performs the image transform processing when said analysis means decides that the printing data is multi-valued.

14. The printer according to claim 11, further comprising means for transferring processing capability information of said printer to said host.

* * * * *